(12) United States Patent
Hartmann et al.

(10) Patent No.: US 7,216,260 B2
(45) Date of Patent: May 8, 2007

(54) METHOD, SYSTEM AND PROGRAM PRODUCT FOR DYNAMICALLY DETECTING ERRANT DATA SEQUENCES AND PERFORMING CORRESPONDING ACTIONS

(75) Inventors: Richard G. Hartmann, Endicott, NY (US); Daniel L. Krissell, Hallstead, PA (US); Thomas E. Murphy, Jr., Vestal, NY (US); Francine M. Orzel, Endicott, NY (US); Paul F. Rieth, Apalachin, NY (US); Jeffrey S. Stevens, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/108,682

(22) Filed: Mar. 27, 2002

(65) Prior Publication Data
US 2003/0188232 A1    Oct. 2, 2003

(51) Int. Cl.
G06F 11/00    (2006.01)
G06F 15/16    (2006.01)

(52) U.S. Cl. .......................... 714/39; 709/224; 714/49
(58) Field of Classification Search ........ 709/223–224, 709/225, 229; 713/200–201
See application file for complete search history.

(56) References Cited

U.S. PATENT DOCUMENTS

| | | | | |
|---|---|---|---|---|
| 5,159,597 A | * | 10/1992 | Monahan et al. ............. | 714/2 |
| 5,278,901 A | | 1/1994 | Shieh et al. ................ | 713/200 |
| 5,485,409 A | | 1/1996 | Gupta et al. ................ | 713/200 |
| 5,557,742 A | | 9/1996 | Smaha et al. ............... | 713/200 |
| 5,606,668 A | * | 2/1997 | Shwed ....................... | 713/201 |
| 5,828,846 A | * | 10/1998 | Kirby et al. ................ | 709/238 |
| 5,835,726 A | * | 11/1998 | Shwed et al. ............... | 709/229 |

(Continued)

FOREIGN PATENT DOCUMENTS

WO    99/48303    9/1999

OTHER PUBLICATIONS

Tech Note: Stateful Inspection Technology, Check Point Software Technologies, Ltd., 1999, 8 pages.*

(Continued)

*Primary Examiner*—Patrice L. Winder
(74) *Attorney, Agent, or Firm*—Hoffman, Warnick & D'Alessandro LLC

(57) ABSTRACT

The present invention provides a method, system and program product for dynamically detecting an errant data sequence transmitted over a network and performing a corresponding action. Specifically, a data sequence is received by a server from a client and compared to a definable data structure. The data structure comprises rules that each correspond to a state of communication between the server and the client. Each rule sets forth a predetermined data sequence, an optional condition and an action. If the received data sequence: (1) matches one of the predetermined data sequences in the data structure; (2) is relevant to (was received during) the state of communication to which the matched predetermined data sequence corresponds; and (3) meets any enumerated conditions, a corresponding action is implemented.

21 Claims, 4 Drawing Sheets

U.S. PATENT DOCUMENTS

| | | |
|---|---|---|
| 5,864,683 A | 1/1999 | Boebert et al. ............. 709/249 |
| 5,878,231 A * | 3/1999 | Baehr et al. ................ 709/243 |
| 5,918,018 A | 6/1999 | Gooderum et al. ......... 709/225 |
| 5,950,195 A | 9/1999 | Stockwell et al. ............. 707/4 |
| 6,230,284 B1 * | 5/2001 | Lillevold ..................... 714/13 |
| 6,279,113 B1 | 8/2001 | Vaidya ....................... 713/201 |
| 6,308,276 B1 | 10/2001 | Ashdown et al. ........... 713/201 |
| 6,347,376 B1 * | 2/2002 | Attwood et al. ............ 713/201 |
| 6,496,935 B1 * | 12/2002 | Fink et al. .................. 713/201 |
| 6,816,455 B2 * | 11/2004 | Goldberg et al. ........... 370/389 |
| 2003/0145226 A1 * | 7/2003 | Bruton et al. ............... 713/201 |

OTHER PUBLICATIONS

Dougals E. Comer et al., Internetworking With TCP/IP vol. III: Client-Server Programming and Applications: Windows Sockets Version, 1997, Prentice-Hall, Inc., pp. 220-221.*

Clarkin, M., "Comparison of CyberwallPLUS Intrusion Prevention and Current IDS technology," NETWORK-1 Security Solutions, Inc. White Paper, May 2001.

"Host-Resident Firewalls: Defending Windows NT/2000 Servers and Desktops from Network Attacks," NETWORK-1 Security Solutions, Inc. White Paper, 2000.

* cited by examiner

| COMM. STATE | SEQUENCE | CONDITIONS | ACTIONS |
|---|---|---|---|
| CONNECT PHASE | 0x123456789 | MORE THAN TWICE | LOG TO FILE |
| | 0x231437483 | | DISCONNECT |
| NEGOTIATION PHASE | 0x4368088087 | TWICE FROM SAME SOURCE | LOG TO FILE; NOTIFY ADMIN. |
| STEADY-STATE PHASE | 0x3795091237 | MORE THAN FOUR TIMES | LOG TO FILE |
| CONFIRMATION PHASE | 0xCCFF233E6 | | NOTIFY ADMIN. |
| TERMINATION PHASE | 0x239471290F | | NOTIFY ADMIN. |
| | 0xD12FF56CC | MORE THAN TWICE | DISCONNECT LOG TO FILE. |
| ALL PHASES | 0x12EE34DD6 | | DISCONNECT LOG TO FILE |

*FIG. 3*

METHOD, SYSTEM AND PROGRAM PRODUCT FOR DYNAMICALLY DETECTING ERRANT DATA SEQUENCES AND PERFORMING CORRESPONDING ACTIONS

BACKGROUND OF THE INVENTION

1. Field of the Invention

The present invention generally relates to a method, system and program product for dynamically detecting errant data sequences, under optionally enumerated conditions and performing corresponding actions. Specifically, the present invention utilizes a definable data structure to detect and handle an errant data sequence received over a network.

2. Background Art

As the implementation of computer networks in business becomes more pervasive, the frequency in which accidental or malicious attacks on such networks increases. For example, a printer attached to a server on the network may experience an error that causes a certain data sequence to be generated. Unfortunately, in generating the data sequence, the printer might get caught in a loop that causes the same data sequence to be generated and sent to the server thousands of times. When this occurs, an application residing on the sever will receive each data sequence in rapid succession. This causes the data sequences to pile up in the server's memory, which may ultimately crash the server. Similar problems are experienced when a network is subject to a malicious denial of service attack. Specifically, in an attempt to deprive other users of the capability to connect to the server, a hacker could establish multiple connections with a server in the network from a single client. Such connections would drain the capacity of the server and thus, cause service to be denied to legitimate users.

Heretofore, attempts have been made to circumvent these problems by hard coding a solution to the errant data (e.g., problematic, recurring, etc.) sequences into the application itself. For example, with respect to the printer scenario discussed above, the application would be hard coded to search for the particular errant data sequence that causes the problem, and take appropriate action. However, various problems arise when hard coding an application in this manner. Specifically, with each solution that is implemented, a service release involving modification of the code in the application must be made to all customers. This is not only costly, but also causes the customer to experience downtime while their application is updated or serviced. Moreover, since new errant data sequences are constantly being discovered, hard coding the solutions into the application can become unduly burdensome to both the application's creator and the customers.

In view of the foregoing, there exists a need for a method, system and program product for dynamically detecting errant data sequences such that hard coding a solution into an underlying application is not required. Further, a need exists for errant data sequences to be dynamically detected based on a definable data structure. Moreover, a need exists for corresponding actions (e.g., corrective, filtering, etc.) to be implemented when an errant data sequence is detected.

SUMMARY OF THE INVENTION

In general, the present invention provides a method, system and program product for dynamically detecting an errant data sequence (e.g., problematic, recurring, etc.) transmitted over a network and performing a corresponding action. Specifically, a data sequence is received by a server from a client and compared to a definable data structure. The data structure comprises rules that each pertain to a state of communication between the server and a client. Each rule sets forth a predetermined data sequence, an optional condition and an action. If the received data sequence: (1) matches one of the predetermined data sequences in the data structure; (2) was received during the state of communication to which the rule pertains; and (3) meets any enumerated conditions, a corresponding action is performed.

According to a first aspect of the present invention, a method for dynamically detecting an errant data sequence and performing a corresponding action is provided. The method comprises the steps of: (1) receiving a data sequence in an application; (2) accessing a definable data structure that contains predetermined data sequences and actions; (3) comparing the received data sequence to the predetermined data sequences in the data structure; and (4) performing a corresponding action, if the received data sequence matches one of the predetermined data sequences.

According to a second aspect of the present invention, a method for dynamically detecting an errant data sequence and performing a corresponding action is provided. The method comprises the steps of: (1) providing an application stored on a computer system; (2) receiving a data sequence in the application; (3) comparing the received data sequence to predetermined data sequences identified in a definable data structure; (4) determining whether the received data sequence is relevant to a state of communication during which it was received; (5) determining whether the received data sequence meets an enumerated condition identified in the data structure; and (6) performing a corresponding enumerated action.

According to a third aspect of the present invention, a system for dynamically detecting an errant data sequence and performing a corresponding action is provided. The system comprises: (1) a system for receiving a data sequence in an application; (2) a system for accessing a definable data structure that contains predetermined data sequences and actions; (3) a system for comparing the received data sequence to the predetermined data sequences in the data structure; and (4) a system for performing a corresponding action, if the received data sequence matches one of the predetermined data sequences.

According to a fourth aspect of the present invention, a program product stored on a recordable medium for dynamically detecting an errant data sequence and performing a corresponding action is provided. When executed, the program product comprises: (1) program code for receiving a data sequence in an application; (2) program code for accessing a definable data structure that contains predetermined data sequences and actions; (3) program code for comparing the received data sequence to the predetermined data sequences in the data structure; and (4) program code for performing a corresponding action, if the received data sequence matches one of the predetermined data sequences.

Therefore, the present invention provides a method, system and program product for dynamically detecting an errant data sequence and performing a corresponding action.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an exemplary table representation of a data structure according to the present invention.

Figure 1:
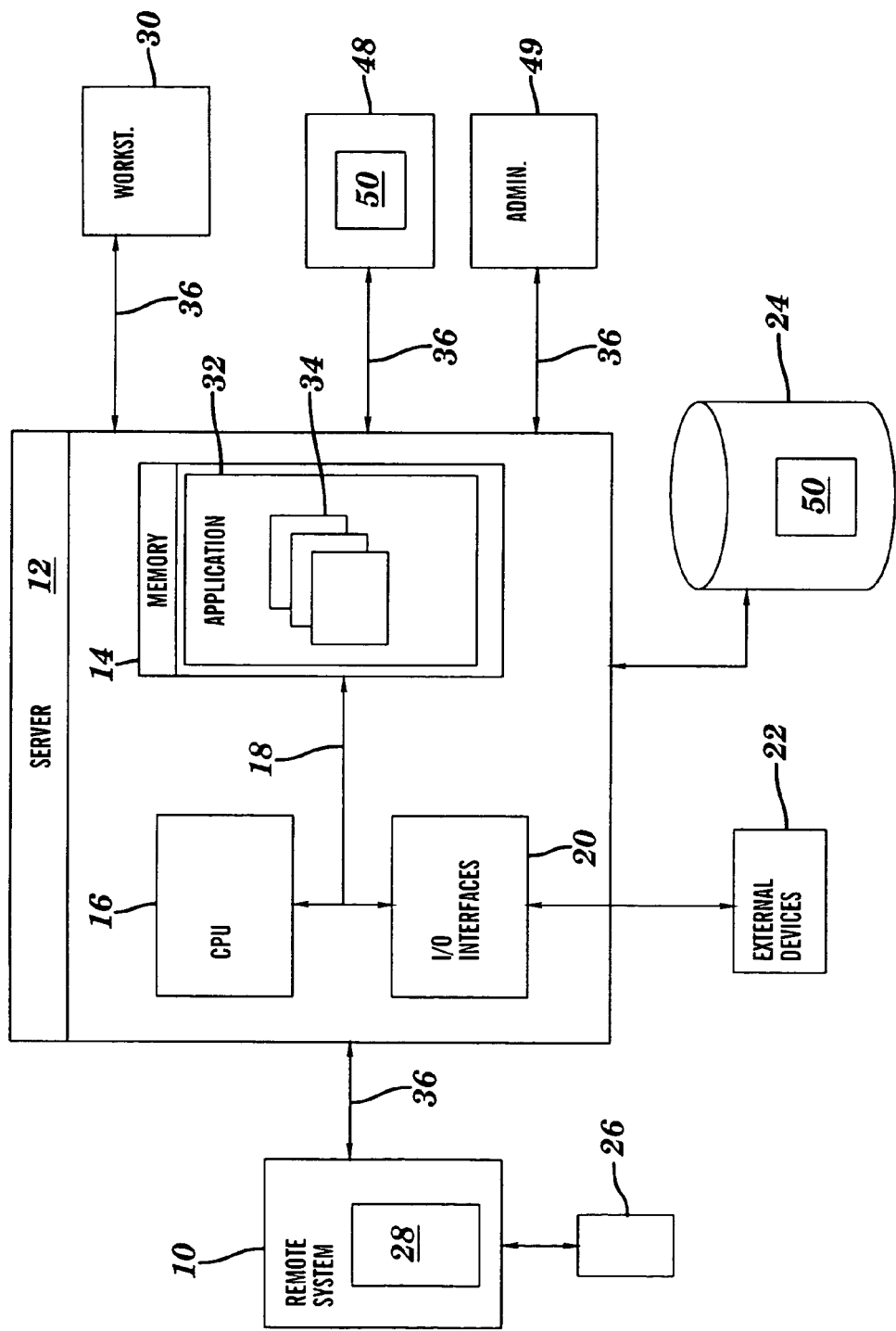
FIG. 1 depicts a computer system having an application with checkpoints according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention allows an errant data sequence transmitted over a network to be dynamically detected and handled. Specifically, under the present invention, an application on a server is programmed with one or more checkpoints. When a data sequence is received from a client, the checkpoint will perform various operations, based on a definable data structure, to determine whether the received data sequence is errant. If the received data sequence is in fact errant, the appropriate action will be implemented. Such actions can include, among others, corrective actions, filtration, etc. As used herein, the term "errant" is intended to refer to any problematic, troublesome or recurring data sequence. In the content of the present invention, an errant data sequence is one that may cause a computer system (e.g., a server) to malfunction. However, it should be appreciated that, while the present invention is described herein as a solution to errant data sequences, it might also be implemented as a solution that can flag or identify non-errant data sequences. This would be analogous to filtering based on certain phrases or keywords.

Referring now to FIG. 1, a typical network implementation of the present invention is depicted. As shown, remote system 10, workstation 30, optional remote storage 48 and administrator 49 communicate with server 12 via communications links 36, Communications links 36 are intended to represent any possible method of communicating with server 12. For example workstation 30 and/or administrator 49 can communicate with server 12 as/with a direct terminal connected to server 12 or remotely in a client-server environment. In the case of the latter, client and server may be connected via the Internet, wide area networks (WAN), local area networks (LAN) or other private networks. The server and client may utilize conventional network connectivity, such as Token Ring, Ethernet, or other conventional communications standards. Moreover, remote system 10 and remote storage 48 are intended to be representative of systems connected to server 12 in a client-server environment via, for example, the Internet. In this case, connectivity could be provided by conventional TCP/IP sockets-based protocol, and remote system 10 would utilize an Internet service provider to establish connectivity to server 12. It should be understood that the depiction of FIG. 1 is intended to be exemplary only, and that the present invention could be implemented with many network variations.

As shown, server 12 generally comprises memory 14, central processing unit (CPU) 16, bus 18, input/output (I/O) interfaces 20, external devices/resources 22 and database 24. Memory 14 may comprise any known type of data storage and/or transmission media, including magnetic media, optical media, random access memory (RAM), read-only memory (ROM), a data cache, a data object, etc. Moreover, memory 14 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 20 may comprise any system for exchanging information to/from an external source. External devices 22 may comprise any known type of external device, including speakers, a CRT, LED screen, hand-held device, keyboard, mouse, voice recognition system, speech output system, printer, monitor, facsimile, pager, etc. Bus 18 provides a communication link between each of the components in the server 12 and likewise may comprise any known type of transmission link, including electrical, optical, wireless, etc. In addition, although not shown, additional components, such as cache memory, communication systems, system software, etc., may be incorporated into server 12.

Database 24 may provide storage for information necessary to carry out the present invention such as a definable data structure 50, etc. As such, database 24 may include one or more storage devices, such as a magnetic disk drive or an optical disk drive. In another embodiment, database 24 includes data distributed across, for example, a local area network (LAN), wide area network (WAN) or a storage area network (SAN) (not shown). Database 24 may also be configured in such a way that one of ordinary skill in the art may interpret it to include one or more storage devices.

It should be understood that although not shown in FIG. 1, remote system 10 and workstation 30 include computer components (e.g., CPU, memory, etc.) similar to server 12. Such components have not been shown for brevity purposes.

Stored in remote system 10 is emulator program 28, which allows remote system 10 to emulate workstation 30. That is, emulator program 28 allows a remote system 10 (e.g., a laptop) to adopt the look and feel of an office workstation. This is especially helpful to a user who is out of the office, and has configured workstation 30 to have a particular look and feel (e.g., arrangement of icons, etc.). Without emulator program 28, communication with server 12 will occur via a web browser. Because the user may be not as familiar with interfacing with server 12 through a browser, the user may be less efficient. One common type of emulator program 28 is known as Telnet. For example, if server 12 is an AS/400 or iSeries server available from International Business Machines, Corp. of Armonk, N.Y., Telnet 5250 emulator program can be used to make any remote system 10 have the look and feel of workstation 30.

It should be understood, that the use of emulator program 28 is not necessary under the present invention. Rather, emulator program 28 has been depicted only to provide one scenario in which the present invention can be implemented.

As indicated above, errant data sequences have caused great problems for network servers. For example, if the user is out of the office and using remote system 10 to communicate with server 12, the user may wish to print a document to printer 26. Because remote system 10 includes emulator program 28, printer 26 that is local to remote system 10 (e.g., connected to the laptop in the hotel room), will appear to server 12 as if it is actually connected locally to server 12. However, if printer 26 experiences an error, a data sequence indicating the error will be generated and communicated to server 12. Should printer 26 get caught in a loop, the same data sequence could be communicated to application 34 in server 12 thousands of times. Such communications can result in server 12 crashing. Similarly, a hacker using remote system 10 to establish multiple connections to server 12 could cause, for example, a legitimate remote system or workstation 30 to be denied a connection to server 12 because the pool of available connections is completely consumed by the hacker system. In this case, the hacker would communicate the same data sequence multiple times to server 12. In either of these two scenarios, the data sequence is considered an errant data sequence because it will cause some level of problems for the server 12.

To avoid such problems, application 32 (e.g., an operating system) is preprogrammed with one or more checkpoints 34 to dynamically detect errant data sequences from remote system 10 and/or workstation 30. Under the present invention, each checkpoint 34 can be thought of as a detection system that includes sub-systems (i.e., program code) for processing an incoming data sequence, based on a definable data structure, to determine if the incoming data sequence is errant. If so, appropriate corresponding action can be taken. It should be understood that checkpoints 34 can be programmed into any location of application 32. This allows checkpoints 34 to be strategically programmed within application 32. It should also be understood that although application 32 is typically an operating system, the teachings of the present invention could be used with any application.

Figure 2:
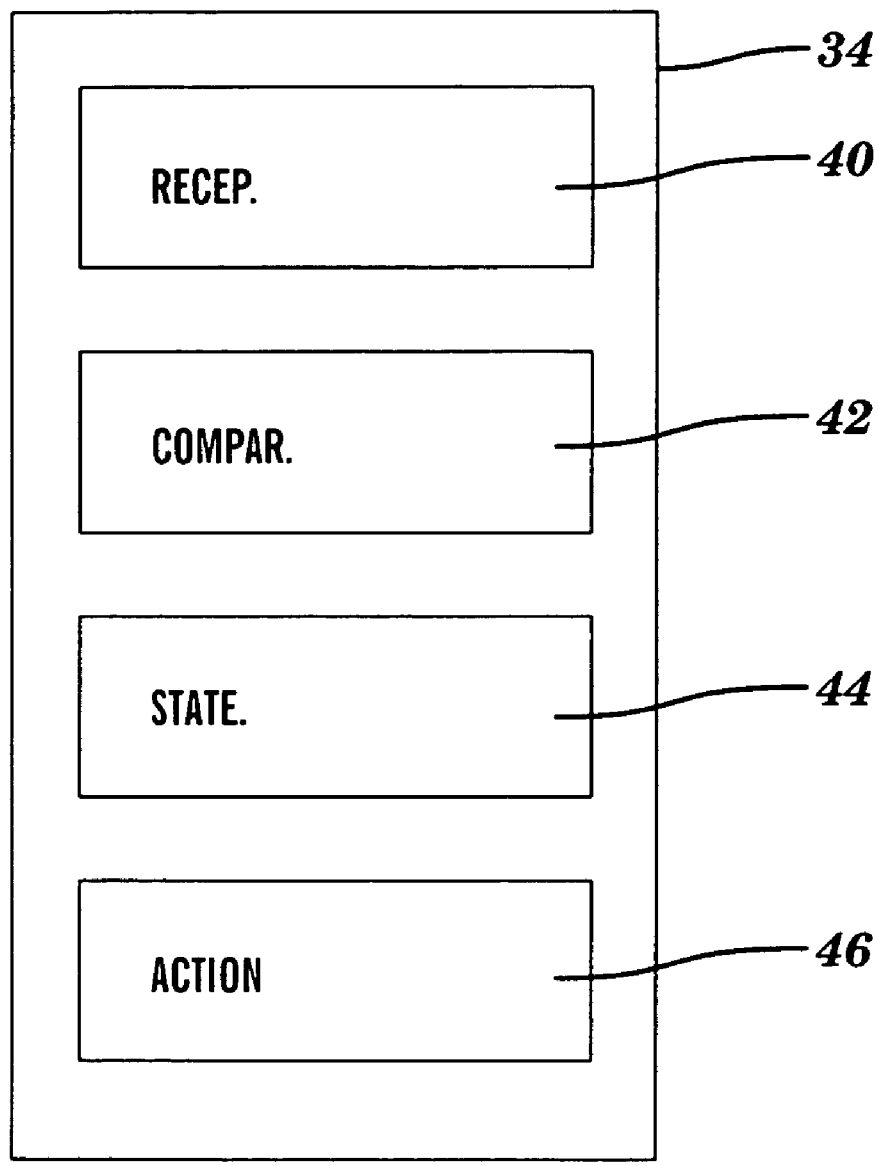
FIG. 2 depicts a box diagram of one of the checkpoints of FIG. 1.

Referring now to FIG. 2, an exemplary checkpoint 34 is shown in greater detail. As depicted, checkpoint 34 includes reception system 40, comparison system 42, state system 44 and action system 46. Reception system 40 will receive an incoming data sequence. Once received, a definable data structure will be accessed from local storage (e.g., database 24, diskette, etc.) or remote storage 48. Under the present invention, the data structure is created using program code in a language such as Extensible Markup Language (XML) and comprises rules that each correspond to one or more communication states. The communication states relate to the phases of communication between server 12 and another computer system such as remote system 10 and/or workstation 30. Such states are generally well known in the art and include: (1) connect phase; (2) negotiation phase; (3) steady-state phase; (4) confirmation phase; and (5) termination phase. Each rule typically includes a predetermined data sequence, a corresponding action, and an optional condition.

Referring to FIG. 3, an exemplary depiction of data structure 50 in a table form is shown. As indicated above, data structure 50 is definable (e.g., modifiable) and is created using XML or the like. The depiction of data structure 50 as a table is for illustrative purposes only. As depicted, data structure 50 includes rules 52A–H with each rule corresponding to a communication state 54 and identifying a predetermined data sequence 56, an enumerated condition 58 (if any) and an action 60. Under this data structure 50, a received data sequence is errant if it: (1) matches a predetermined data sequence; (2) is relevant to the communication state during which it was received; and (3) meets any enumerated conditions (i.e., conditions set forth). For example, under "connect phase," two rules 52A–B have been identified. If data sequence "0x123456789" is received more than twice from the same source during the "connect phase," the data sequence is errant and a log to the file should be made. If however, the data sequence was not received more than twice from the same source, or if the data sequence was received during another communication state (e.g., during negotiation phase), the received data sequence would not be identified as errant and no action would be taken.

As can be further seen from data structure 50, it is not necessary to specify any conditions. For example, if data sequence 0xCCFF233E6 in rule 52E is received at all during the "confirmation phase," an administrator will be notified. Moreover, data structure 50 can be defined to include an "All Phases" 52H rule. This allows a particular data sequence to be made applicable to all communication states. That is, it would not be necessary to input the same data sequence under each communication phase.

Data structure 50 is particularly advantageous because it is not hard coded into application 32 and is modifiable. Previously, errant data sequences and solutions were hard coded into application 32. This was not only time-consuming and expense, but it also required updated versions of the application 32 to be circulated to all customers. This problem was compounded by the fact that new errant data sequences are constantly being discovered. Thus, updating application 32 became constant and unduly burdensome.

Under the present invention, all information necessary to identify and deal with errant data sequences, are contained in the updatable data structure 50, As new errant data sequences are discovered, or existing data sequences are modified, an update to data structure 50 is all that is required. To this extent, data structure 50 can be stored locally in database 24 (FIG. 1) or at a remote location 48 to which server 12 can be pointed. If stored locally on server 12, updates to data structure 50 can be disseminated with far less effort than disseminating updates to the application 32. Moreover, if data structure 50 is merely pointed to by server 12, the customer need not even be aware of the update.

In a typical embodiment, definable data structure 50 is constructed using XML. Listed below is exemplary code associated therewith:

```
<XML>
    <Head>
        <Sender>
            <OrganizationName>IBM</OrganizationName>
            <OrganizationAuthenticationInfo>XXXXX</
            OrganizationAuthenticationInfo>
        </Sender>
    </Head>
    <Body>
        <TelnetPrinters>
            <Data>
                <HexBytes>12345678901234</HexBytes>
                <State>Steady</State>
                <Action>Disconnect</Action>
                <Action>Filter<Action>
                <Action>LogToFile</Action>
                <ConsecutivePacketsToAccept>2</
                ConsecutivePacketsToAccept>
            <Data>
            <Data>
                <HexBytes>FF12EE34DD56</HexBytes>
                <State>All</State>
                <Action>Disconnect</Action>
                <Action>NotifyAdministratorr</Action>
                <ConsecutivePacketsToAccept>10</
                ConsecutivePacketsToAccept>
            </Data>
        </TelnetPrinters>
        <OtherApplication>
        . . .
        </OtherApplication>
    </Body>
</XML>
```

As can be seen from the above code, data structure 50 can incorporate any quantity and/or type of applications running on server 12. That is, data structure 50 is not limited to one type of application. If multiple applications are running on server 12, and each application has its own errant sequences, data structure 50 can filter incoming data sequences according to application. For example, if a received data sequence is errant for application "A" but not for application "B," and application "A" did not receive/process the data sequence, there would be no need to implement any type of action.

In any event, once a data sequence is received by reception system comparison system 42 will compare the received data sequences to the predetermined data sequence identified in the data structure 50. If a match is established, state system 44 will determine whether the received data sequence is relevant to a state of communication. In making this determination, the current state of communication must be identified. This can be done prior to or after comparing the data sequence to the data sequences in data structure 50. In either event, once the current state of communication is known, it will be determined whether the received data sequence was indicated in data structure 50 as being relevant to this state. As indicated above, a data sequence might be identified as errant only during the negotiation phase. Thus, if the received data sequence was received during the steady-state phase, the received data sequence cannot be errant. However, if it is determined that the received data sequence was received during the relevant/pertinent communication state, then it would be determined if any enumerated conditions have been met. For example, if the corresponding rule indicated that the data sequence is errant if received more than twice consecutively from the same source, and the data sequence was received only once from a single source, it would not be identified as errant. Conversely, if the data sequence was received more than twice from the same source, then action system 46 would perform any corresponding actions. Such actions include, but are not limited to, logging the errant data sequence in a file, notifying an administrator 49, disconnecting a device (e.g., the printer 26), etc.

Figure 4:
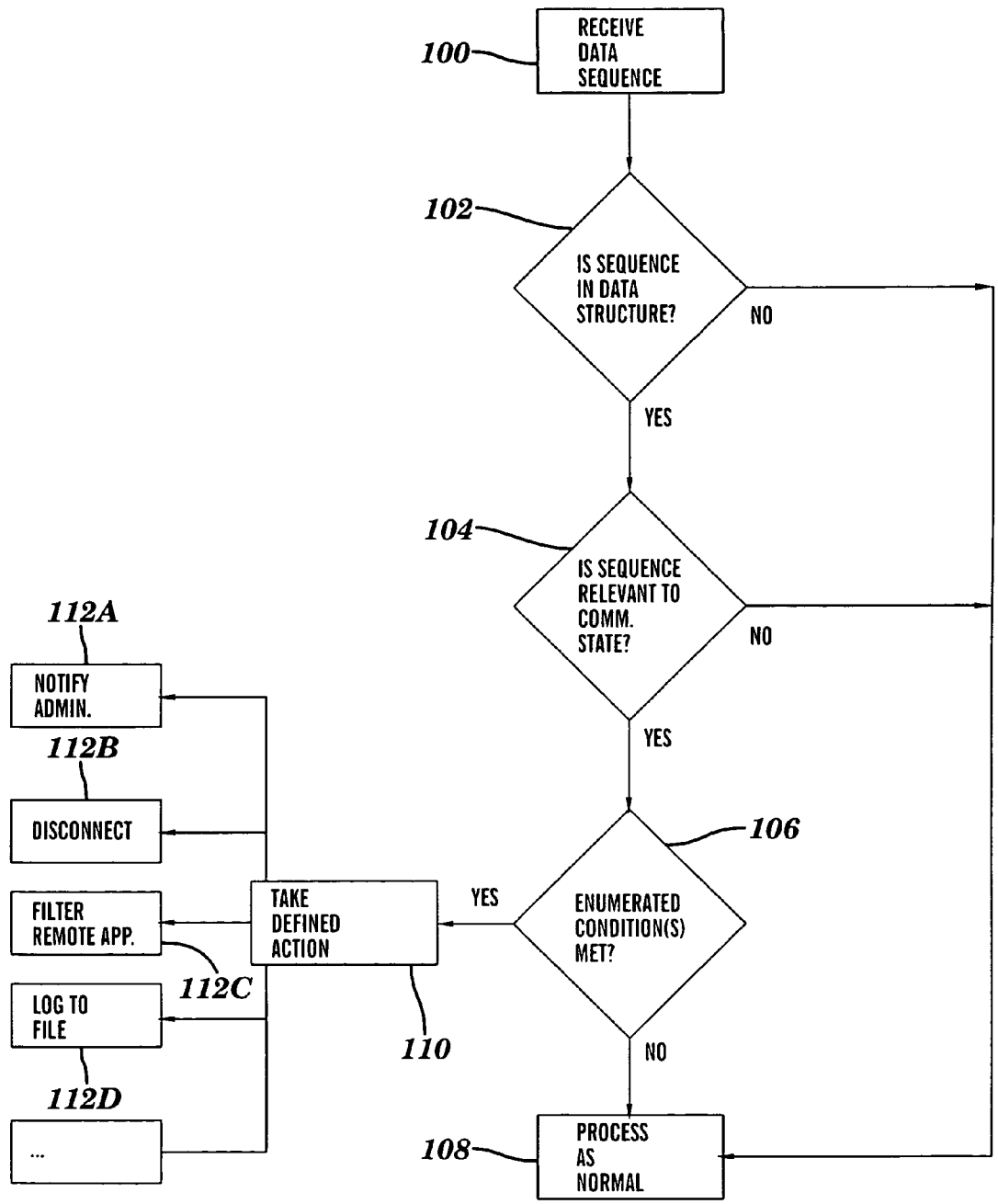
FIG. 4 depicts a process flow diagram of the present invention.

Referring now to FIG. 4, a method flow diagram of the present invention is shown in detail. As depicted, a data sequence is received 100 and compared to data structure to identify any matches 102. If no match exists, the data sequence is not errant and is processed by server 12 as normal 108. If, however, a match exists, it is then determined whether the received data sequence pertains to a relevant communication state 104. Specifically, it is determined whether data sequence was received during the communication state that corresponds to the matched predetermined data sequence. If not, the data sequence is processed as normal 108. Conversely, if the received data sequence does pertain to the relevant communication state, then it must be determined whether any enumerated conditions have been met 106. If not, then the data sequence is processed as normal 108. However, if the data sequence also met the enumerated conditions, the defined corresponding action(s) would be taken 110. As shown, such actions could include, among other things, notifying an administrator 112A, disconnecting a device 112B, filtering a remote application 112C, logging the file 112D, etc. Accordingly, because data sequences can be processed as they are received based on a definable data structure, the present invention provides the capability to dynamically detect and handle errant data sequences.

It should be understood that, as indicated above, above-referenced steps could be performed in a varying order. For example, a current state of communication (i.e., for determining state of communication relevance) could be identified prior to or after comparing the received data sequence to data structure 50 to identify any matches.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls server 12 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for dynamically detecting an errant data sequence and performing a corresponding action, comprising:

receiving a data sequence in an application;

accessing, by the application, a definable data structure, separate from the application, that contains predetermined data sequences, which are known to cause the application to perform incorrectly, and actions;

comparing the received data sequence to the predetermined data sequences in the data structure to determine whether the received data sequence is errant; and performing a corresponding action, if the received data sequence matches one of the predetermined data sequences.

2. The method of claim 1, wherein the data structure comprises rules corresponding to states of communication, and wherein each rule includes one of the predetermined data sequences and one of the actions.

3. The method of claim 2, wherein each rule further comprises a condition for taking the corresponding action when the predetermined data sequence in the rule matches a received data sequence.

4. The method of claim 1, further comprising the step of establishing a checkpoint in the application prior to the receiving step, wherein the application is an operating system.

5. The method of claim 1, further comprising the step of determining whether the data sequence was received during a relevant state of communication, prior to the performing step.

6. A method for dynamically detecting an errant data sequence and performing a corresponding action, comprising:
provide an application stored on a computer system;
receiving a data sequence in the application;
comparing, by the application, the received data sequence to predetermined data sequences, which are known to cause the application to perform incorrectly, identified in a definable data structure that is separate from the application, to determine whether the received data sequence is errant;
determining whether the received data sequence was received during a relevant state of communication;
determining whether the received data sequence meets an enumerated condition identified in the data structure; and
performing a corresponding action.

7. The method of claim 6, further comprising the step of accessing a data structure prior to the comparing step, wherein the data structure comprises rules corresponding to states of communication of the computer system, and wherein each rule includes a predetermined data sequence and a corresponding action.

8. The method of claim 7, wherein each rule further comprises a condition for taking the corresponding action when the predetermined data sequence in the rule matches a received data sequence.

9. The method of claim 8, wherein the condition includes receipt of the data sequence more than once from a particular source.

10. The method of claim 6, wherein the computer system is a server, wherein the application is an operating system, wherein the data sequence is received from a client, and wherein the predetermined data sequences do not include data that specifies the client.

11. The method of claim 6, wherein the state of communication is selected from the group consisting of connect phase, negotiation phase, steady-state phase, confirmation phase and termination phase.

12. A system for dynamically detecting an errant data sequence and performing a corresponding action, comprising:
a system for receiving a data sequence in an application;
a system for accessing, by the application, a definable data structure, separate from the application, that contains predetermined data sequences, which are known to cause the application to perform incorrectly, and actions;
a system for comparing the received data sequence to the predetermined data sequences in the data structure to determine whether the received data sequence is errant; and
a system for performing a corresponding action, if the received data sequence matches one of the predetermined data sequences.

13. The system of claim 12, wherein the data structure comprises rules corresponding to states of communication, and wherein each rule includes one of the predetermined data sequences and one of the actions.

14. The system of claim 13, wherein each rule further comprises a condition for taking the corresponding action when the predetermined data sequence in the rule matches a received data sequence.

15. The system of claim 12, further comprising a system for determining whether the received data sequence was received during a relevant state of communication.

16. The system of claim 15, wherein the system for determining comprises a system for identifying a current state of communication.

17. A program product stored on a recordable medium for dynamically detecting an errant data sequence and performing a corresponding action, which when executed comprises:
program code for receiving a data sequence in an application;
program code for accessing, by the application, a definable data structure, separate from the application, that contains predetermined data sequences, which are known to cause the application to perform incorrectly, and actions;
program code for comparing the received data sequence to the predetermined data sequences in the data structure to determine whether the received data sequence is errant; and
program code for performing a corresponding action, if the received data sequence matches one of the predetermined data sequences.

18. The program product of claim 17, wherein the data structure comprises rules corresponding to states of communication, and wherein each rule includes one of the predetermined data sequences and one of the actions.

19. The program product of claim 18, wherein each rule further comprises a condition for taking the corresponding action when the predetermined data sequence in the rule matches a received data sequence.

20. The program product of claim 17, further comprising program code for determining whether the received data sequence was received during a relevant state of communication.

21. The program product of claim 20, wherein the program code for determining comprises program code for identifying a current state of communication.

* * * * *